United States Patent
Perneti et al.

(10) Patent No.: US 12,112,213 B2
(45) Date of Patent: Oct. 8, 2024

(54) SCHEDULING WORKLOADS BASED ON PREDICTED MAGNITUDE OF STORAGE CAPACITY SAVINGS ACHIEVED THROUGH DEDUPLICATION

(71) Applicant: Dell Products L.P., Round Rock, TX (US)

(72) Inventors: Jayanth Kumar Reddy Perneti, Bangalore (IN); Vinay Sawal, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 702 days.

(21) Appl. No.: 17/216,929

(22) Filed: Mar. 30, 2021

(65) Prior Publication Data
US 2022/0318070 A1 Oct. 6, 2022

(51) Int. Cl.
*G06F 9/50* (2006.01)
*G06F 16/215* (2019.01)

(52) U.S. Cl.
CPC .......... *G06F 9/5083* (2013.01); *G06F 16/215* (2019.01)

(58) Field of Classification Search
CPC .... G06F 9/5083; G06F 16/215; G06F 9/5038; G06F 2209/5019; G06F 2209/5021
See application file for complete search history.

(56) References Cited

U.S. PATENT DOCUMENTS

| | | | | |
|---|---|---|---|---|
| 9,317,331 | B1* | 4/2016 | Koh | G06F 9/5066 |
| 10,380,074 | B1* | 8/2019 | Gu | G06F 16/1752 |
| 2008/0172526 | A1* | 7/2008 | Verma | G06F 3/0611 |
| | | | | 711/170 |
| 2013/0091102 | A1* | 4/2013 | Nayak | G06F 3/067 |
| | | | | 707/E17.044 |
| 2014/0304239 | A1* | 10/2014 | Lewis | G06F 3/0608 |
| | | | | 707/692 |
| 2015/0286949 | A1* | 10/2015 | Ivanov | G06N 5/048 |
| | | | | 706/52 |

OTHER PUBLICATIONS

S. Tripathy et al., "Fuzzy Fairness Controller for NVMe SSDs," Association for Computing Machinery, https://doi.org/10.1145/3392717.3392766, Jun.-Jul. 2020, 12 pages.
(Continued)

*Primary Examiner* — Jorge A Chu Joy-Davila
(74) *Attorney, Agent, or Firm* — Ryan, Mason & Lewis, LLP

(57) ABSTRACT

An apparatus comprises a processing device configured to identify a plurality of workloads to be scheduled for execution on a storage system and to analyze the plurality of workloads to predict a magnitude of storage capacity savings achieved by applying one or more deduplication algorithms to data of the plurality of workloads. The processing device is further configured to determine a prioritization of the plurality of workloads based at least in part on the predicted magnitude of the storage capacity savings achieved by applying the one or more deduplication algorithms to the data of the plurality of workloads, and to schedule the plurality of workloads for execution on the storage system based at least in part on the determined prioritization of the plurality of workloads.

20 Claims, 20 Drawing Sheets

(56) References Cited

OTHER PUBLICATIONS

J.-L. Chameau et al., "Membership Functions I: Comparing Methods of Measurement," International Journal of Approximate Reasoning, vol. 1, 1987, pp. 287-301.
J. Dombi, "Membership Function as an Evaluation," Fuzzy Sets and Systems, vol. 35, No. 1, Mar. 1990, 19 pages.
A. Homaifar et al., "Simultaneous Design of Membership Functions and Rule Sets for Fuzzy Controllers Using Genetic Algorithms," IEEE Transactions on Fuzzy Systems, vol. 3, No. 2, May 1995, pp. 129-139.
N. Mogharreban et al., "Comparison of Defuzzification Techniques for Analysis of Non-interval Data," Annual Conference of the North American Fuzzy Information Processing Society, Jul. 2006, 4 pages.
D. Samanta, "Chapter 5—Defuzzification Methods," Indian Institute of Technology Kharagpur, 7 pages.
Dell EMC, "Dell EMC Data Domain Operating System," Version 6.1, Administration Guide 302-003-761 REV. 05, Feb. 2019, 556 pages.
Dell Inc., "Dell EMC Avamar," Administration Guide 19.2, Jun. 2020, 328 pages.
Dell EMC, "Dell EMC PowerProtect DD Management Center," Version 7.1, Installation and Administration Guide REV 02, Feb. 2020, 166 pages.
Dell EMC, "Deduplication Solutions Are Not All Created Equal, Why Data Domain?" Jan. 2017, 12 pages.

\* cited by examiner

| MEMBERSHIP SET | FUZZY RULE | INTERPRETATION |
|---|---|---|
| 1 | IF DE-DUPLICATION UNFRIENDLY DATA INTENSITY IS LOW, THEN PRIORITY IS HIGH | $\mu_L(I) \neq 0 \rightarrow \mu_{HP}(I) = \mu_L(I)$ |
| 2 | IF DE-DUPLICATION UNFRIENDLY DATA INTENSITY IS MODERATE, THEN PRIORITY IS MEDIUM | $\mu_{\tilde{M}}(I) \neq 0 \rightarrow \mu_{MP}(I) = \mu_{\tilde{M}}(I)$ |
| 3 | IF DE-DUPLICATION UNFRIENDLY DATA INTENSITY IS HIGH, THEN PRIORITY IS LOW | $\mu_H(I) \neq 0 \rightarrow \mu_{LP}(I) = \mu_H(I)$ |

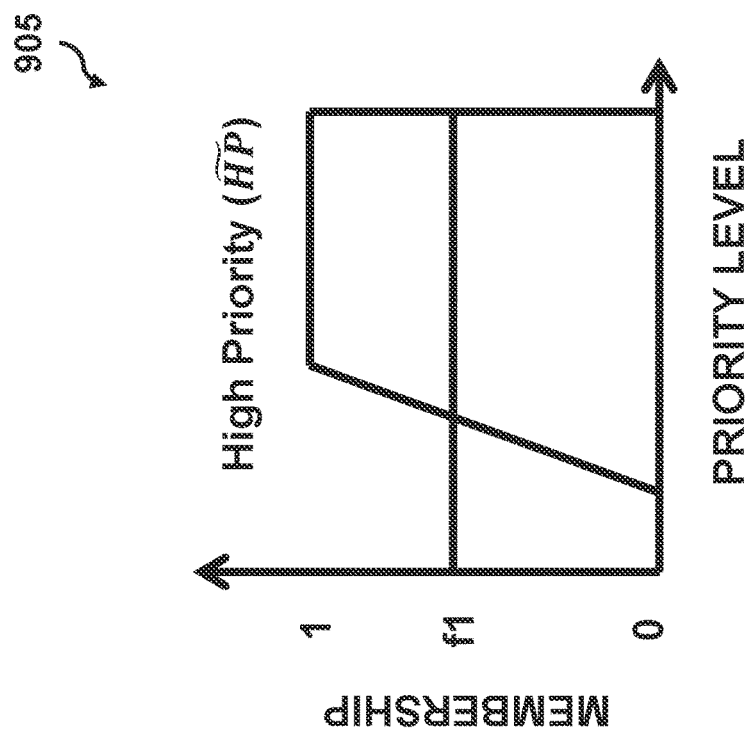
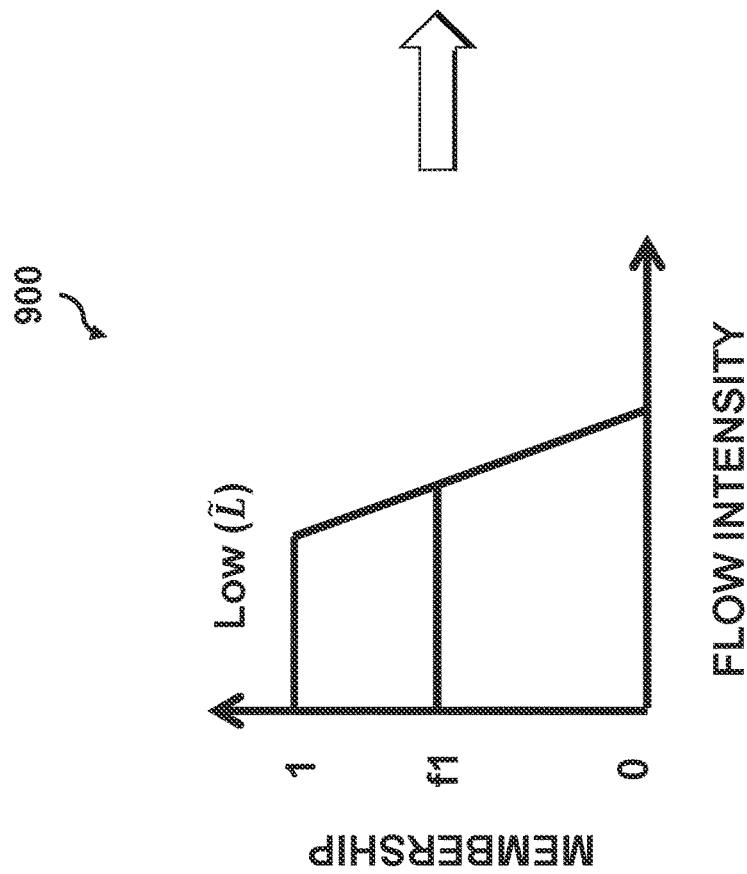
FIG. 9A

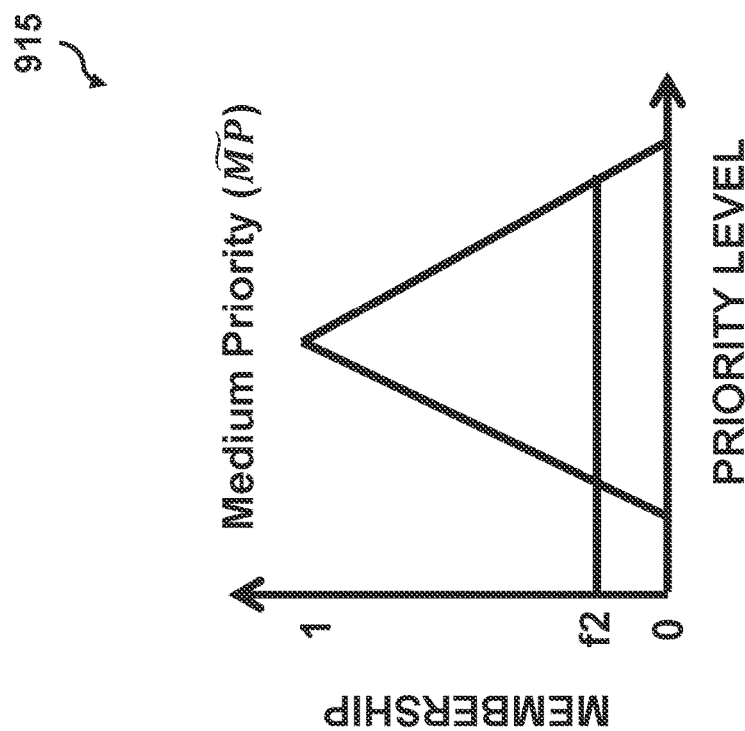
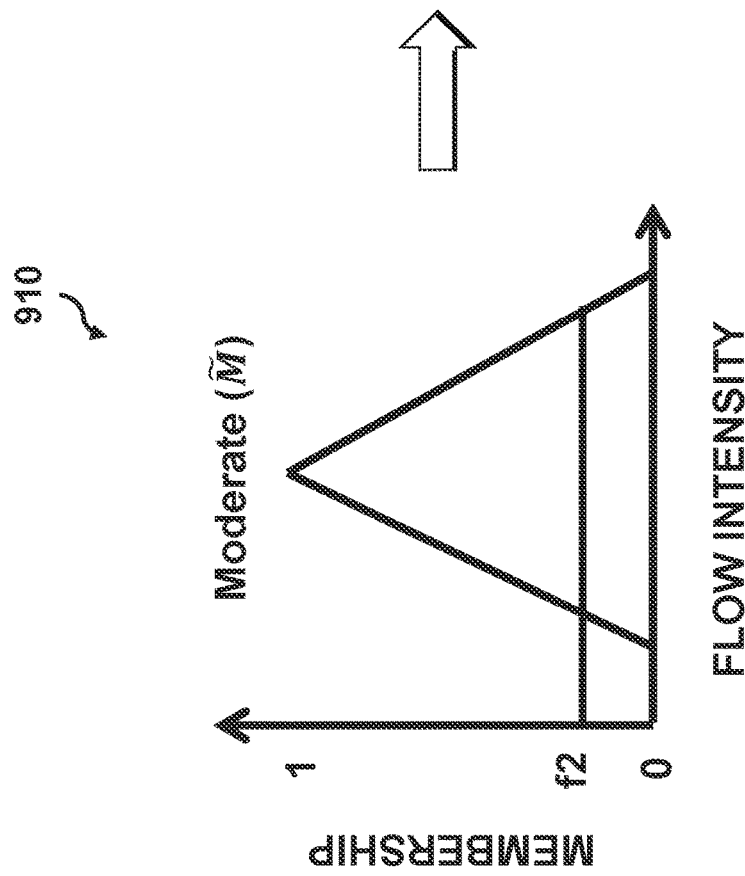
FIG. 9B

SCHEDULING WORKLOADS BASED ON PREDICTED MAGNITUDE OF STORAGE CAPACITY SAVINGS ACHIEVED THROUGH DEDUPLICATION

FIELD

The field relates generally to information processing, and more particularly to storage in information processing systems.

BACKGROUND

As the amount of data stored in a storage environment increases, the task of performing backups in the storage environment becomes more complex. Even with advanced backup management solutions in place, backup tasks may fail due to various errors. Such errors include, but are not limited to, network issues, misconfiguration of backup policies, unplanned downtime, and storage space issues. Storage space issues may be a result of unexpected consumption of available storage capacity in storage systems of a storage environment. Failure of backup tasks may impact reliability and disrupt operations of a storage environment.

SUMMARY

Illustrative embodiments of the present invention provide techniques for scheduling workloads based on predicted magnitude of storage capacity savings achieved through deduplication.

In one embodiment, an apparatus comprises at least one processing device comprising a processor coupled to a memory. The at least one processing device is configured to perform the steps of identifying a plurality of workloads to be scheduled for execution on a storage system and analyzing the plurality of workloads to predict a magnitude of storage capacity savings achieved by applying one or more deduplication algorithms to data of the plurality of workloads. The at least one processing device is further configured to perform the steps of determining a prioritization of the plurality of workloads based at least in part on the predicted magnitude of the storage capacity savings achieved by applying the one or more deduplication algorithms to the data of the plurality of workloads, and scheduling the plurality of workloads for execution on the storage system based at least in part on the determined prioritization of the plurality of workloads.

These and other illustrative embodiments include, without limitation, methods, apparatus, networks, systems and processor-readable storage media.

BRIEF DESCRIPTION OF THE DRAWINGS

FIG. 8 shows a table of control rules for membership in fuzzy sets in an illustrative embodiment.

FIGS. 9A-9C show plots of membership in multiple fuzzy sets in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
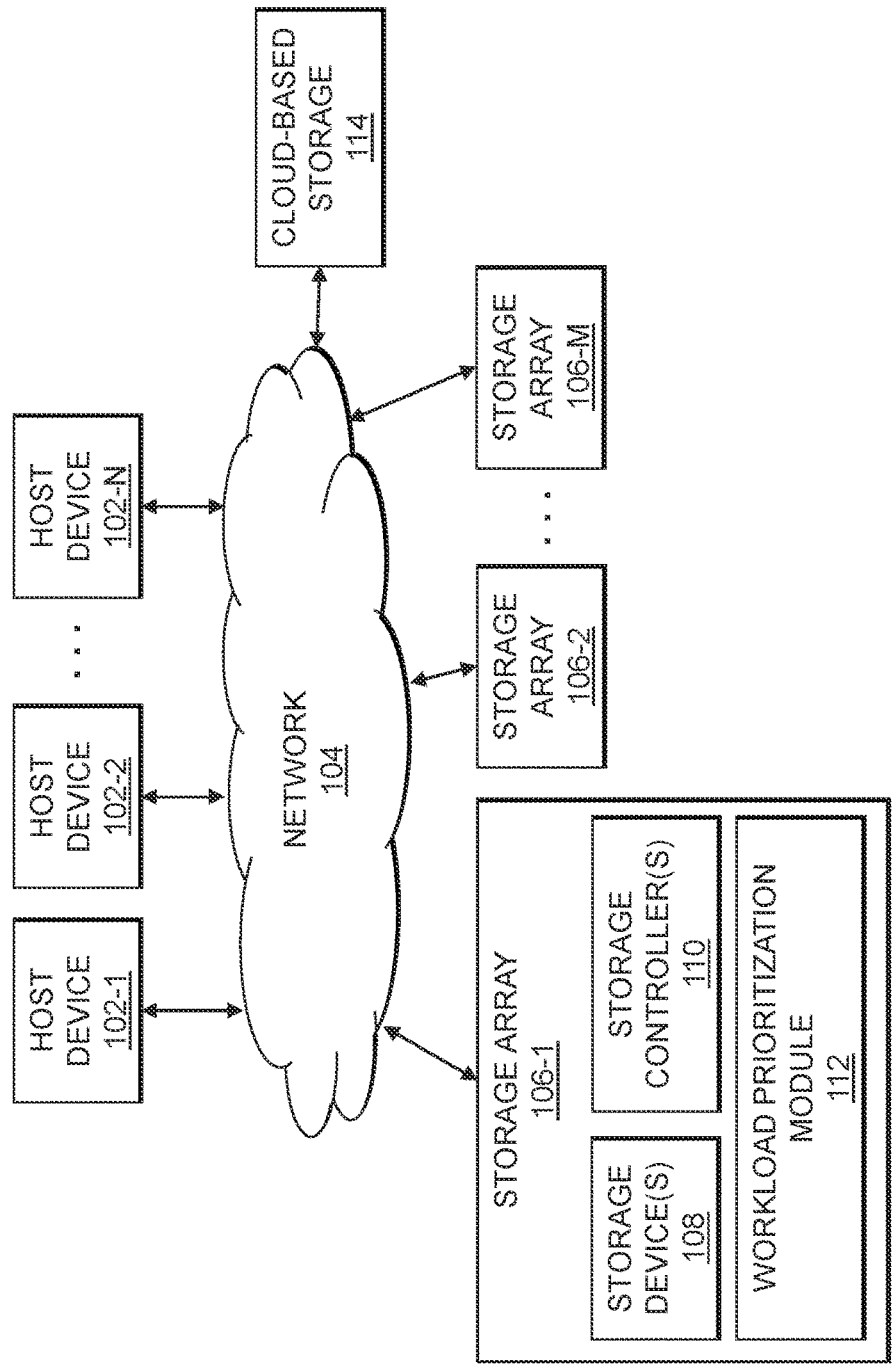
FIG. 1 is a block diagram of an information processing system for scheduling workloads based on predicted magnitude of storage capacity savings achieved through deduplication in an illustrative embodiment of the invention.

FIG. 1 shows an information processing system 100 configured in accordance with an illustrative embodiment to schedule workloads based on predicted magnitude of storage capacity savings achieved through deduplication. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102.

The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

In the information processing system 100 of FIG. 1, the host devices 102 are assumed to access one or more storage volumes provided by the storage arrays 106. Storage volumes provided by the storage devices of one or more of the storage arrays 106 may be grouped to provide one or more virtual volumes that are accessed by the host devices 102. The storage array 106-1 further includes a workload prioritization module 112 that is configured to provide functionality for scheduling workloads based on predicted magnitude of storage capacity savings achieved through deduplication.

The workload prioritization module 112 is configured to identifying incoming workloads (e.g., from the host devices 102) that are to be scheduled to run on the storage array 106-1 (or on one or more other ones of the storage arrays 106-2 through 106-M). The workload prioritization module 112 is further configured to analyze the incoming workloads to determine types of data that will be utilized by the incoming workloads. For example, the storage array 106-1 may comprise a deduplication-based storage system, and the incoming workloads may be analyzed to determine whether the data of such incoming workloads is "friendly" to deduplication. This may include determining a predicted amount of space savings by application of deduplication to the data of the workloads. The prediction may be based at least in part on the type of workload or data it contains. Compressed data and video data, for example, are not likely to achieve sufficient space savings through deduplication. The workload prioritization module 112 is further configured to generate ranking, ordering or other prioritization for scheduling the workloads to run based on the determined deduplication-unfriendliness of the data.

When the workload prioritization module 112 determines that the storage capacity of the storage devices 108 of the storage array 106-1 reaches some designated level, the workloads may be scheduled in accordance with the prioritization to reduce the rate at which storage is consumed to prevent the storage array 106-1 from reaching a full capacity condition. This may include scheduling workloads which are more likely to benefit from application of deduplication techniques. This allows for application or proactive measures to counter storage becoming full, such as in moving data from the storage devices 108 of the storage array 106-1 to one or more other ones of the storage arrays 106-2 through 106-M, or to cloud-based storage 114.

In some embodiments, the storage arrays 106 provide an "active" tier of a storage backup system, with the cloud-based storage 114 providing an "inactive" tier of the storage backup system. In other embodiments, however, the storage arrays 106 may themselves provide both the active and inactive tier of the storage backup system. For example, a first subset of the storage arrays 106 (e.g., storage arrays 106-1 and 106-2) may provide the active tier while a second subset of the storage arrays 106 (e.g., storage arrays 106-3 through 106-M) may provide the inactive or backup tier. In some cases, it is possible for the same set of storage arrays 106 to provide both the active and inactive or backup tier of a storage backup system. For example, a first subset of the storage devices 108 of storage array 106-1 may provide an active tier while a second subset of the storage devices 108 of the storage array 106-1 may provide an inactive or backup tier. Various other examples are possible. It should thus be appreciated that the term "active tier" as used herein is intended to be broadly construed. An active tier may comprise an active tier of a multi-tier storage system, an active part of a single-tier storage system, etc. It should further be appreciated that, within the active tier, different types of storage devices may be utilized.

The workload prioritization module 112 may be utilized in various different scenarios. For example, the workload prioritization module 112 may be implemented as part of a Data Domain management center (DDMC) or Data Domain system manager (DDSM) of a suitably modified Dell EMC Data Domain system or Dell EMC PowerProtect DD system or environment. This enables display of notifications when storage capacity is reaching a full condition and when workload prioritization based on deduplication-unfriendliness of the data of the workloads is being performed. Such information may be displayed within a Dell EMC Avamar Management Console Graphical User Interface (MCGUI) or a Networker Management Center (NMC) for better visualization of data growth and allowing end-users such as storage administrators to initiate workload prioritization based on deduplication-unfriendliness of the data of the workloads, to override or adjust an automatically-generated workload prioritization, etc. Such information may also be displayed within an XtremIO Graphical User Interface (GUI), such as an XtremIO Management Server (XMS) GUI.

In some embodiments, the workload prioritization module 112 is utilized by storage administrators or sales teams, which are notified when storage consumption reaches beyond designated threshold values. This helps the storage administrator or sales teams to proactively approach end-users to explain upcoming storage problems (e.g., storage becoming full) and to provide suggestions for preventing such storage problems, such as by deploying a new model of a storage backup system with latest features, expanding an existing storage backup system, virtual scale-out, performing data movement to cloud-based storage 114, etc.

At least portions of the functionality of the workload prioritization module 112 may be implemented at least in part in the form of software that is stored in memory and executed by a processor.

Although shown as being implemented internal to the storage array 106-1 and outside of the storage controllers 110 in the FIG. 1 embodiment, it should be appreciated that the workload prioritization module 112 may be implemented at least in part internal to one or more of the storage controllers 110, on one or more other ones of the storage arrays 106-2 through 106-M, on one or more of the host devices 102, and/or on another server external to the host devices 102 and storage arrays 106, combinations thereof. Further, multiple instances of the workload prioritization module 112 may be provided (e.g., one for each of the storage arrays 106).

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random-access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 14 and 15.

It is to be understood that the particular set of elements shown in FIG. 1 for scheduling workloads based on predicted magnitude of storage capacity savings achieved through deduplication is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
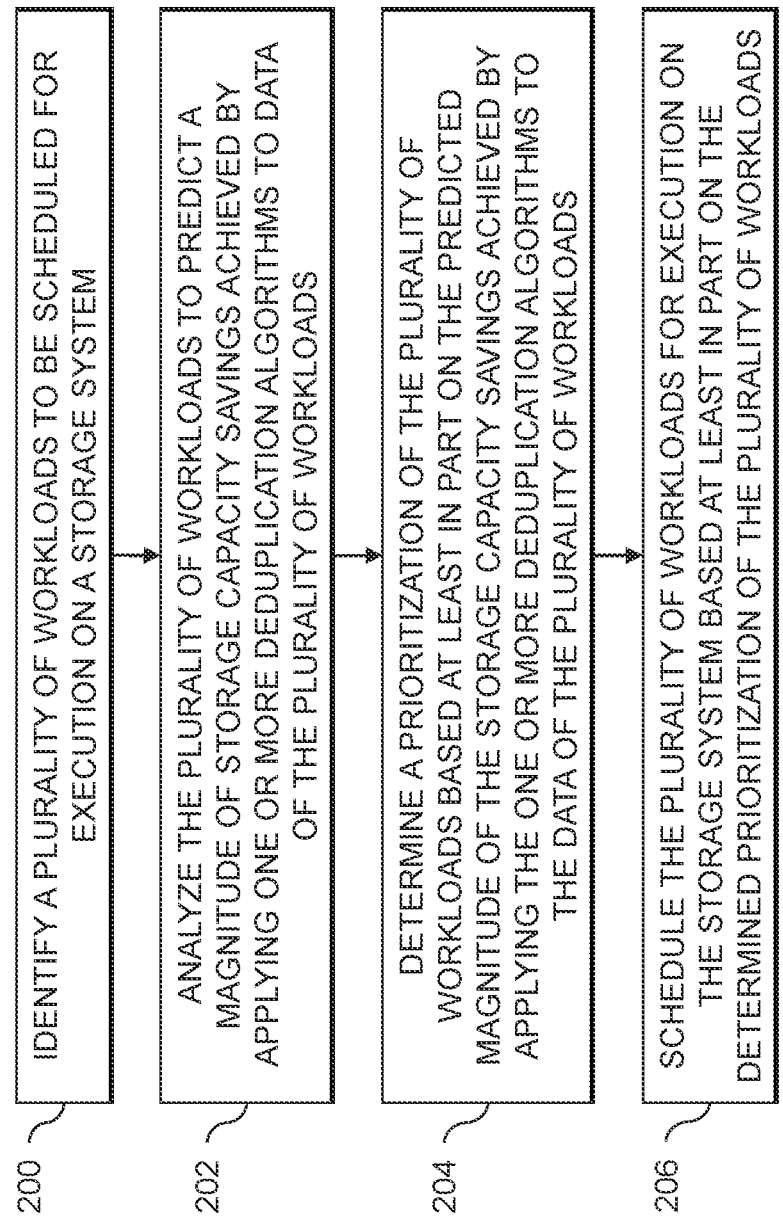
FIG. 2 is a flow diagram of an exemplary process for scheduling workloads based on predicted magnitude of storage capacity savings achieved through deduplication in an illustrative embodiment.

An exemplary process for scheduling workloads based on predicted magnitude of storage capacity savings achieved through deduplication will now be described in more detail with reference to the flow diagram of FIG. 2. It is to be understood that this particular process is only an example, and that additional or alternative processes for scheduling workloads based on predicted magnitude of storage capacity savings achieved through deduplication may be used in other embodiments.

In this embodiment, the process includes steps 200 through 206. These steps are assumed to be performed by the workload prioritization module 112. The process begins with step 200, identifying a plurality of workloads to be scheduled for execution on a storage system. In step 202, the plurality of workloads are analyzed to predict a magnitude of storage capacity savings achieved by applying one or more deduplication algorithms to data of the plurality of workloads. In some embodiments, step 202 includes identifying one or more types of data that are part of respective ones of the plurality of workloads. A prioritization of the plurality of workloads is determined in step 204 based at least in part on the predicted magnitude of the storage capacity savings achieved by applying the one or more deduplication algorithms to the data of the plurality of workloads. The plurality of workloads are scheduled for execution on the storage system in step 206 based at least in part on the determined prioritization of the plurality of workloads. Step 206, in some embodiments, may be performed responsive to determining that the storage system has reached a designated threshold capacity usage.

In some embodiments, predicting the magnitude of the storage capacity savings achieved by applying the one or more deduplication algorithms to the data of a given one of the plurality of workloads comprises detecting an amount of the data of the given workload predicted to achieve storage capacity savings by applying the one or more deduplication algorithms, and determining membership of the given workload in respective ones of a plurality of membership functions based at least in part on the detected amount of data of the given workload predicted to achieve storage capacity savings by applying the one or more deduplication algorithms. Determining the prioritization of the given workload may comprise assigning a priority value to the given workload based at least in part on its membership values for at least one of the plurality of membership functions, or based at least in part on a combination of its membership values for each of the plurality of membership functions.

The plurality of membership functions may comprise a first membership function for workloads with a first range of detected amounts of data predicted to achieve storage capacity savings by applying the one or more deduplication algorithms, a second membership function for workloads with a second range of detected amounts of data predicted to achieve storage capacity savings by applying the one or more deduplication algorithms, and a third membership function for workloads with a third range of detected amounts of data predicted to achieve storage capacity savings by applying the one or more deduplication algorithms. The first range may at least partially overlap the second range, and the second range may at least partially overlap the third range. The first membership function and the third membership function may comprise trapezoidal membership functions, and the second membership function may comprise a triangular membership function.

In some embodiments, the plurality of membership functions comprise fuzzy membership sets, and determining the prioritization of the given workload comprises assigning a priority value to the given workload based at least in part on applying one or more defuzzification algorithms to the membership values of the given workload in each of the fuzzy membership sets. Applying the one or more defuzzification algorithms may comprise applying one of a first of maxima defuzzification algorithm and a last of maxima defuzzification algorithm responsive to the given workload having a non-zero membership value for a single one of the fuzzy membership sets. The first of maxima defuzzification algorithm may be utilized when the given workload has a non-zero membership value for a single one of the fuzzy membership sets having a highest priority level, and the last of maxima defuzzification algorithm may be utilized when the given workload has a non-zero membership value for a single one of the fuzzy membership sets having a priority level below a highest priority level. Applying the one or more defuzzification algorithms may comprise applying a center of sum defuzzification algorithm responsive to the given workload having a non-zero membership value for at least two of the fuzzy membership sets.

To handle the storage of massive amounts of data that is generated in various storage environments, some vendors of storage systems have introduced data deduplication features in their storage products (e.g., including both primary and backup storage products). Customers and end-users are also showing interest in deduplication-based storage systems, as deduplication-based storage systems can significantly decrease storage capacity requirements by eliminating storage of duplicate data. Some customers or end-users, however, may encounter issues associated with storage becoming full on deduplication-based storage systems. Storage becoming full is a serious issue, as it can impact storage system reliability, customer relations, and business operations as well as brand reputation. Storage becoming full may further become an issue in storage backup systems, where backup operations may fail as a result of the unexpected consumption of available storage capacity.

Consider, as an example, a storage backup system (e.g., a Dell EMC Data Domain or Dell EMC PowerProtect DD system or environment) where over a period of 6 days, there are 3,315 storage arrays or storage systems whose capacity reached 100% (for a total of 101,934 storage systems sharing Auto Support (ASUP) data). In this example, around 3.25% of storage systems have capacity which reached 100%. This implies that capacity forecasting engines of the storage systems, which may use segmented regression, are not able to accurately predict capacity for the 3.25% of the storage systems whose capacity reached 100%. This also implies that users (e.g., storage administrators) failed to take proactive action to free up space leading to the 100% space usage on such storage systems and resulting failures in storage operations. Further, by the time that such users perform pro-active measures the storage systems are becoming full. This may be due to a lack of timely warning or notification to the users that storage is becoming full, and as such there is a small time window for the users to perform pro-active measures like cleaning, data movement to other storage, etc., as the storage is filling fast. These issues are common for any deduplication-based storage system. The first issue can be easily handled by choosing a better forecasting model (e.g., a statistical model, an artificial intelligence (AI) or machine learning model, a meta-heuristic model approach, etc.). Illustrative embodiments provide solutions to the second issue.

Currently, when a storage system reaches some threshold capacity value (e.g., 90% usage), a notification may be sent to end users to raise alerts. However, this may not be sufficient to allow the end users to perform sufficient pro-active measures to free up space before the storage system becomes full. Illustrative embodiments thus provide an intelligent workload prioritization system that is based on determining deduplication "unfriendly" data to counter storage reaching full on deduplication-based storage systems. By deduplication "unfriendly" data, it is meant that the data is predicted to provide less than some designated threshold of space savings through application of deduplication. Deduplication "unfriendliness" may be determined based at least in part on domain knowledge. For example, storage administrators or other end users may have knowledge of the types of files and workloads that do not generally deduplicate well (e.g., audio, video, compressed files, etc.). In some embodiments, it is assumed that file types that do and do not deduplicate well are provisioned or defined in the workload prioritization system (e.g., such file types may be specified be end-users).

The intelligent workload prioritization system can thus perform automatic prioritization of workloads, based on their likelihood of containing deduplication-unfriendly data, to counter storage systems reaching full condition. To do so, the intelligent workload prioritization system can analyze incoming workloads to determine their likelihood of containing deduplication-unfriendly data when storage consumption on a storage system reaches some threshold value. This helps to avoid storage filling fast on deduplication-based storage systems that have reached the threshold storage consumption value, giving end users more time to perform proactive measures for freeing up space. In some embodiments, a fuzzy approach for automatic prioritization of incoming workloads is used, where the fuzzy approach is based on or takes into account the intensity of deduplication-unfriendly data.

Figure 3:
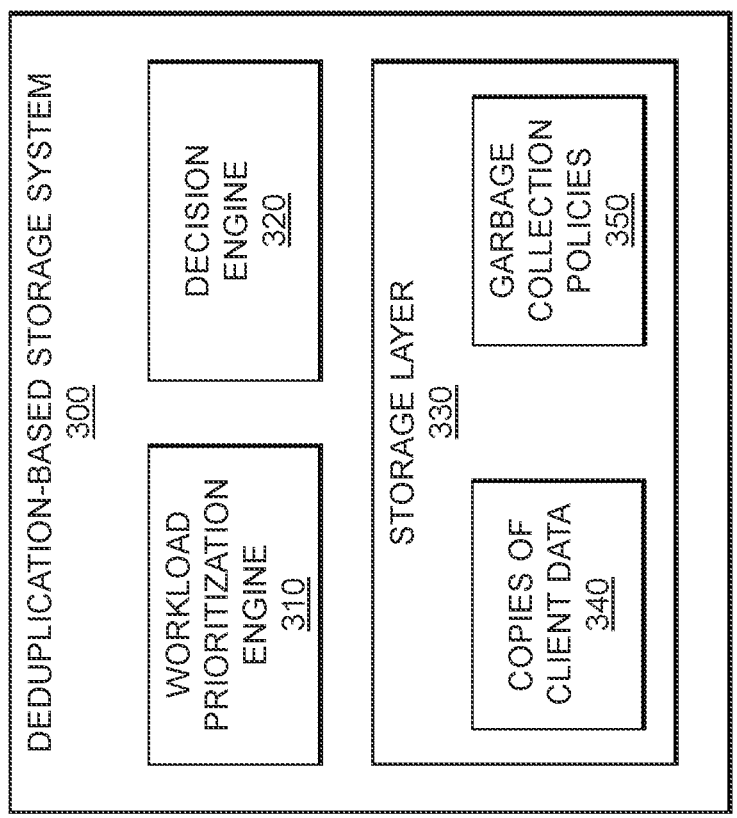
FIG. 3 shows a workload prioritization engine implemented on a deduplication-based storage system in an illustrative embodiment.

In illustrative embodiments, functionality for automatic prioritization of workloads based on the intensity of deduplication-unfriendly data in the workloads is implemented using a workload prioritization engine (e.g., an example of the workload prioritization module 112 described above). In some embodiments, the workload prioritization engine is implemented within a deduplication-based storage system. FIG. 3, for example, illustrates a deduplication-based storage system 300 that implements a workload prioritization engine 310. The deduplication-based storage system 300 also implements a decision engine 320, also referred to as a cleaning or cleanup engine, which is configured to determine proactive measures to take to counter storage becoming full. The deduplication-based storage system 300 further includes a storage layer 330 that includes copies of client data 340 as well as garbage collection or other cleanup policies 350. The decision engine 320 may determine whether to move data (e.g., to one or more storage systems, such as cloud-based storage, external to the deduplication-based storage system 300 not shown in FIG. 3) or whether to initiate garbage collection processes to free up data on the deduplication-based storage system. This may include overriding or modifying the existing garbage collection policies 350.

Figure 4:
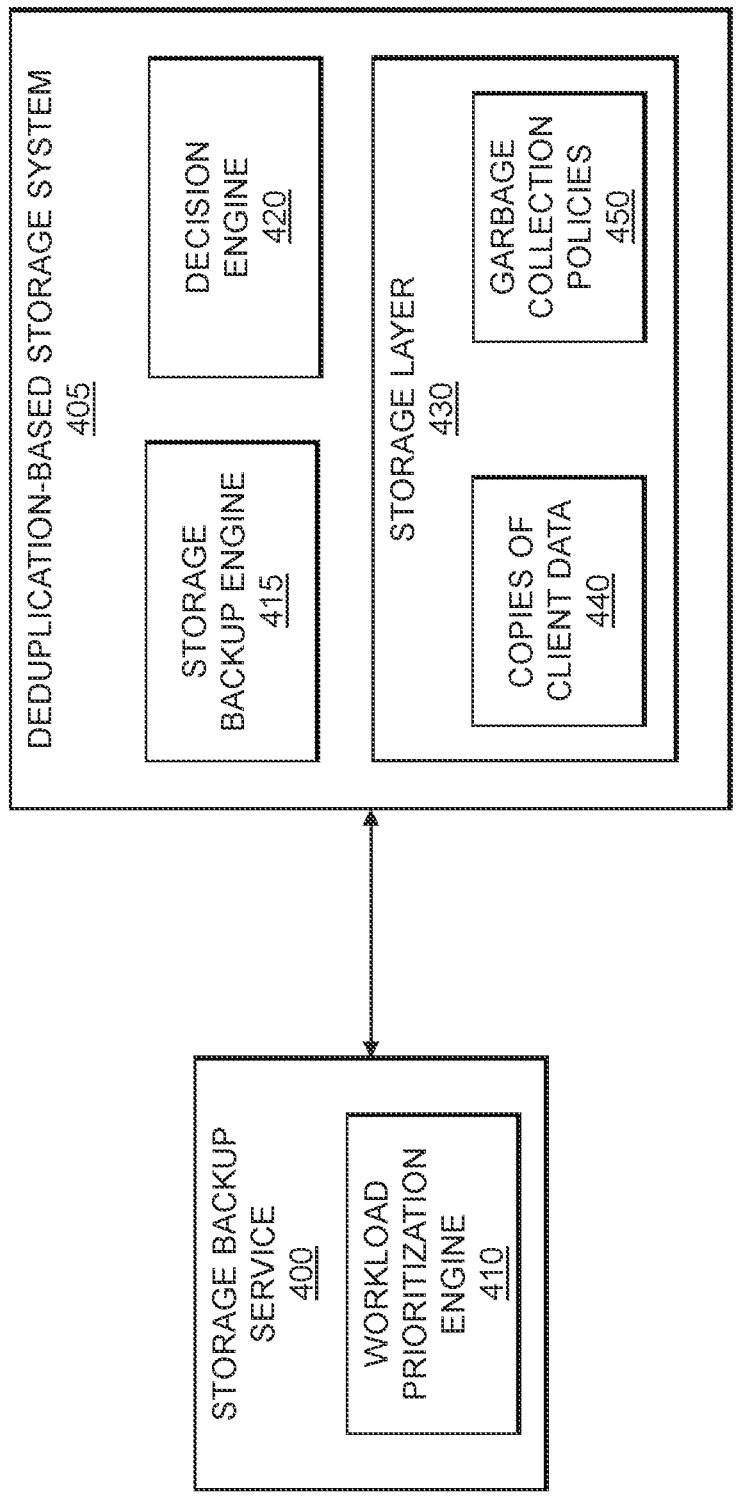
FIG. 4 shows a workload prioritization engine implemented on a storage backup service coupled to a deduplication-based storage system in an illustrative embodiment.

In other embodiments, the workload prioritization engine may be implemented within a workload redirection system (e.g., a backup server in a storage backup ecosystem). FIG. 4, for example, illustrates a storage backup service 400 (e.g., Avamar) that is coupled to a deduplication-based storage system 405 (e.g., DataDomain). The storage backup service 400 implements a workload prioritization engine 410, while the deduplication-based storage system 405 implements a storage backup engine 415 (e.g., a DDSM user interface (UI)), as well as a decision engine 420, storage layer 430, copies of client data 440 and garbage collection policies 450 configured in a manner similar to that of the decision engine 320, storage layer 330, copies of client data 340 and garbage collection policies 350.

The workload prioritization engine, whether implemented internal to a deduplication-based storage system (e.g., the workload prioritization engine 310 of FIG. 3) or external to a deduplication-based storage system (e.g., the workload prioritization engine 410 of FIG. 4), may be configured with a storage space usage threshold $T_S$. The storage space usage threshold $T_S$, may be user-defined. If the current storage consumption of a deduplication-based storage system (e.g., deduplication-based storage system 300 in FIG. 3 or deduplication-based storage system 405 in FIG. 4), the workload prioritization engine (e.g., the workload prioritization engine 310 in FIG. 3 or the workload prioritization engine 410 in FIG. 4) raises an alert or sends a notification to end-users indicating that the storage is becoming full on the associated deduplication-based storage system. The workload prioritization engine may also begin to perform automatic and intelligent prioritization of incoming workloads, such that workloads that have relatively high amounts of deduplication-unfriendly data are given a lower priority and workloads that have relatively low amounts of deduplication-unfriendly data are given a higher priority. In some embodiments, the workload prioritization engine uses a fuzzy approach for automatic prioritization of incoming workloads based on the intensity of deduplication-unfriendly data in the workloads.

The workload prioritization based on the amount or intensity of deduplication-unfriendly data can help to avoid the storage filling as fast on deduplication-based storage systems. Thus, end users are given additional time to perform proactive measures to free up space on the deduplication-based storage systems. In some embodiments, such proactive measures may be implemented automatically by a decision engine (e.g., decision engine 320 in FIG. 3 or decision engine 420 in FIG. 4) to move data to another storage system, to clean up data stored on the deduplication-based storage system (e.g., through initiating garbage collection processes), etc.

As discussed above, in some embodiments the workload prioritization engine utilizes a fuzzy approach for defining the degree or magnitude of deduplication-unfriendly data in a workload. The degree or magnitude of deduplication-unfriendly data in a workload is also referred to the deduplication "intensity" of the workload (e.g., workloads with high amounts of deduplication-unfriendly data are termed as high-intensive or high intensity, while workloads with low amounts of deduplication-unfriendly data are termed as low-intensive or low intensity). The intensity, in some embodiments, is represented as a value between 0 and 1, where if a workload is fully low-intensive or fully high-intensive, the degree of low intensity or high intensity is 1. If a workload is partially low-intensive or high-intensive, the degree of low intensity or high intensity is real number between 0 and 1.

Figure 5A:
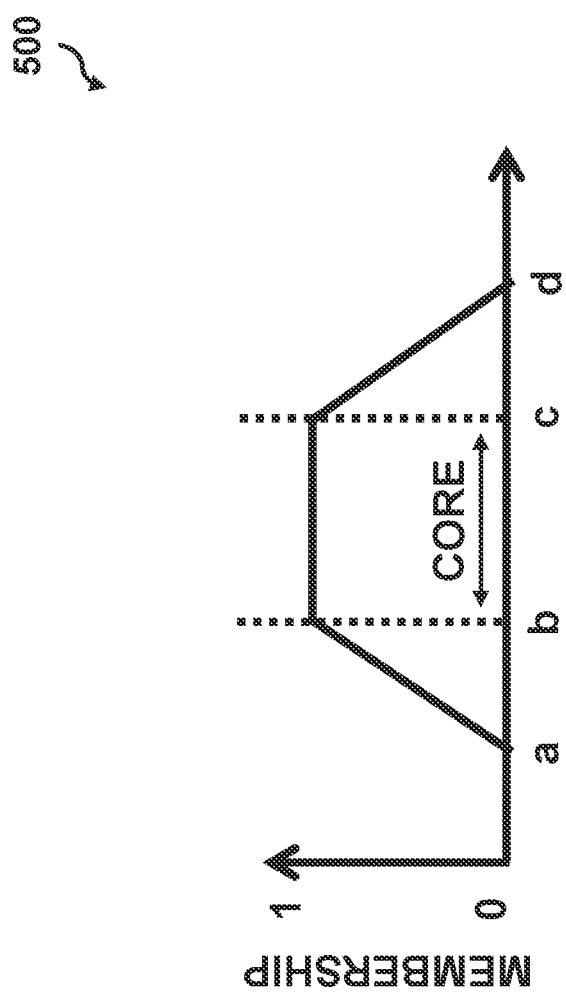
FIG. 5A shows a plot of a trapezoidal membership function in an illustrative embodiment.
Figure 5B:
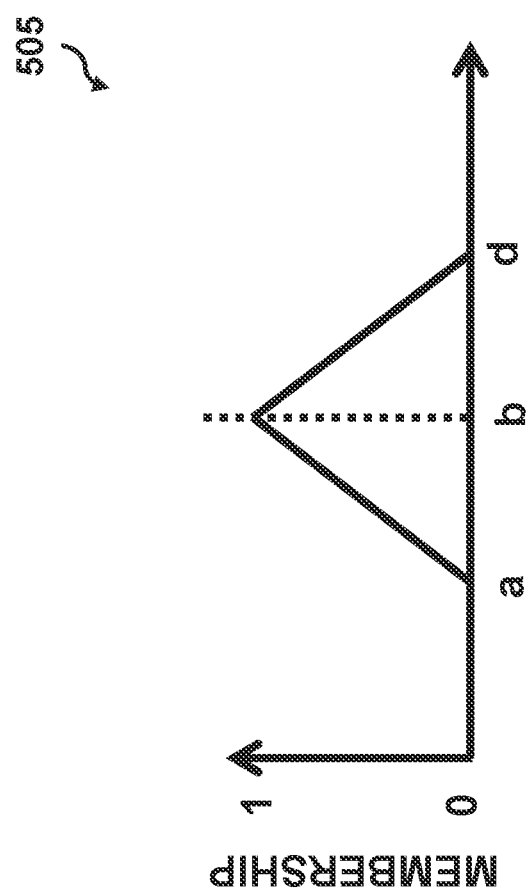
FIG. 5B shows a plot of a triangular membership function in an illustrative embodiment.

The intensity degree may be determined utilizing one or more membership functions. Each fuzzy set is associated with a membership function. Membership functions may be, for example, trapezoidal, triangular, or any other type. FIG. 5A shows an example plot 500 of a trapezoidal membership function, and FIG. 5B shows an example plot 505 of a triangular membership function. Consider the trapezoidal membership function illustrated in the plot 500 of FIG. 5A. The following equation can be used to determine the membership value:

$$\mu_A(x) = \begin{cases} 0, & (x < a) \text{ or } (x > d) \\ \frac{x-a}{b-a}, & a \le x < b \\ 1, & b \le x \le c \\ \frac{d-x}{d-c}, & c < x \le d \end{cases}$$

From the plot 500 of FIG. 5A, if the input value lies between "a" and "b" the membership function value is 1. If the input lies between "c" and "d" the membership function value is a number between 0 and 1 and lies on the falling edge of the trapezoid. The deduplication intensity or degree of a workload may be determined in a similar manner using a membership function. Using the membership function, the degree of deduplication-unfriendly data in a workload may be defined. A workload having less deduplication-unfriendly data will be classified as a low intensity workload with a higher degree of low-intensity. For example, if the amount of deduplication-unfriendly data in a given workload is 30%, the given workload may be 0.8 low-intensity and 0 high-intensity.

Figure 6:
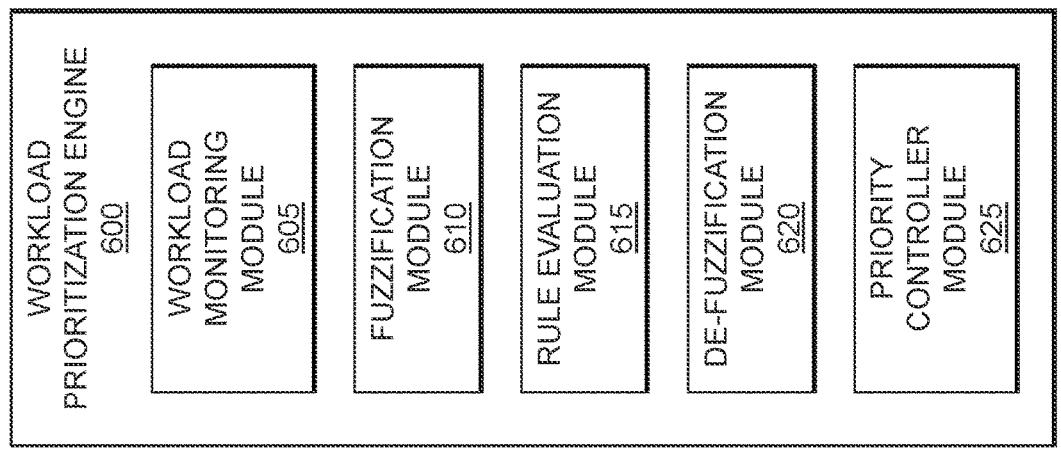
FIG. 6 shows functional modules of a workload prioritization engine in an illustrative embodiment.

FIG. 6 shows functional components or modules of a workload prioritization engine 600. In this example, the workload prioritization engine 600 includes a workload monitoring module 605, a fuzzification module 610, a rule evaluation module 615, a de-fuzzification module 620 and a priority controller module 625. The workload monitoring module 605 is configured to monitor for incoming workloads. For each incoming workload, the workload monitoring module 605 may analyze the workload to identify an amount of deduplication-unfriendly data in that workload. Examples of deduplication-unfriendly data include, but are not limited to, compressed files, video files, etc. Values representing the amount of deduplication-unfriendly data in incoming workloads are provided to the fuzzification module 610.

The fuzzification module 610 is configured to detect the degree of different intensity categories (e.g., representing the amounts of deduplication-unfriendly data) for the incoming workloads based on membership functions of fuzzy sets for such intensity categories. In the description below, it is assumed that there are three different intensity categories (e.g., low, moderate and high). It should be appreciated, however, that there may be any desired number of different intensity categories associated with membership functions of fuzzy sets. Continuing with the example of three different intensity categories, there will be membership functions of fuzzy sets for low, moderate and high intensity. The low and high fuzzy sets may utilize a trapezoidal membership function (e.g., as illustrated in the plot 500 of FIG. 5A) while the moderate fuzzy set may utilize a triangular membership function (e.g., as illustrated in the plot 505 of FIG. 5B). It should be appreciated, however, that this is just an example and that in other embodiments other types and combinations of membership functions may be used for the fuzzy sets of different intensity categories.

Figure 7:
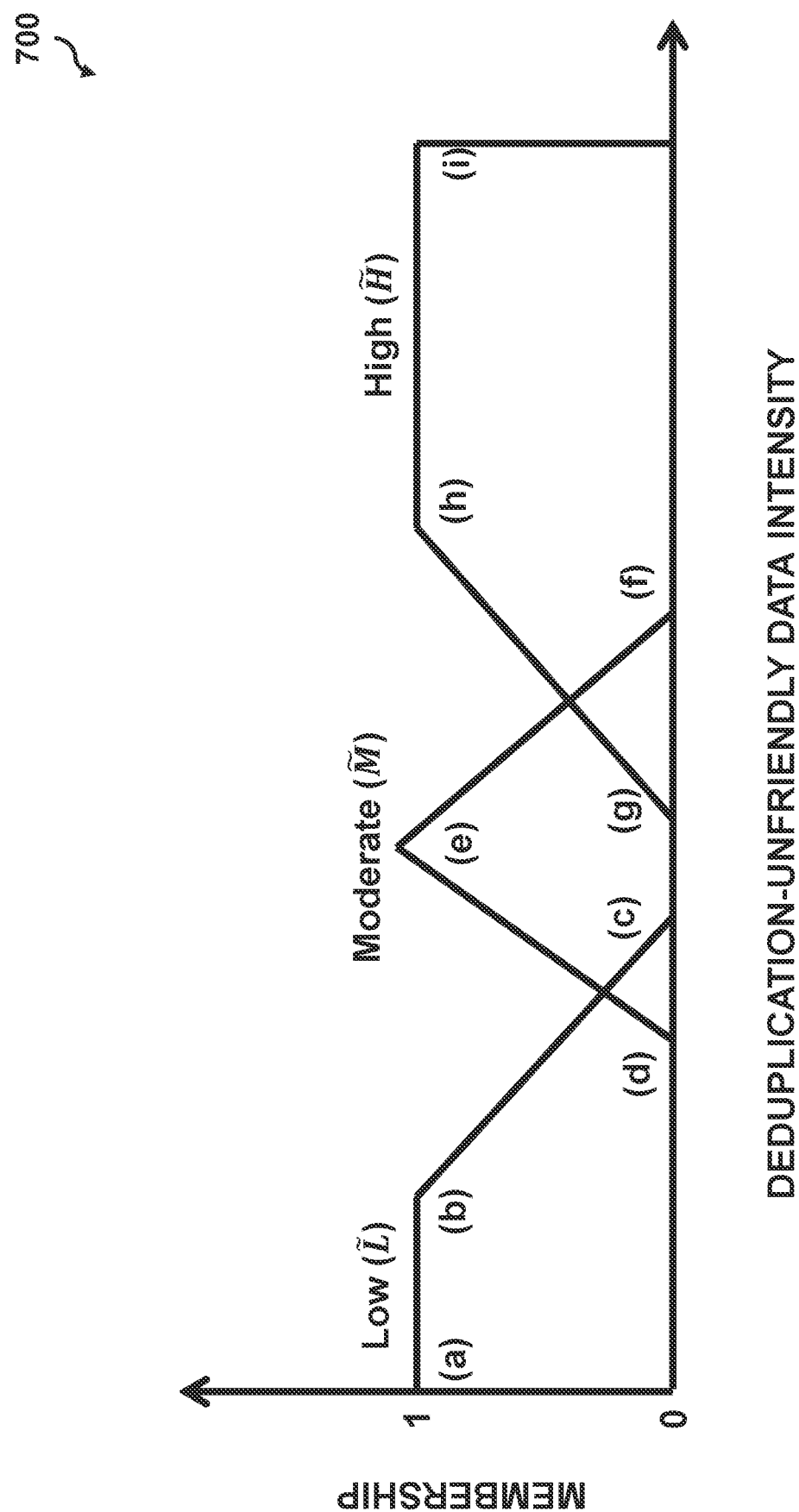
FIG. 7 shows a plot of multiple membership functions associated with different deduplication-unfriendly data intensity priority levels in an illustrative embodiment.

FIG. 7 illustrates a plot 700, which combines trapezoidal membership functions for a low fuzzy set ($\tilde{L}$) and a high fuzzy set ($\tilde{H}$) with a triangular membership function for a moderate fuzzy set ($\tilde{M}$). In this example, if the amount of deduplication-unfriendly data in a workload is very low, then the workload is defined as a fully low intensive workload (e.g., lying between (a) and (b) in the plot 700). If the amount of deduplication-unfriendly data increases, the degree of low intensity decreases and the degree of moderate intensity increases (e.g., the path from (b) to (c) and from (d) to (e) in the plot 700). Similarly, if the amount of deduplication-unfriendly data is high, then the workload is defined as a fully high intensive workload (e.g., lying between (h) and (i)). There is also a transition as the amount deduplication-unfriendly data continues to increase, where the degree of moderate intensity decreases and the degree of high intensity increases (e.g., the path from (e) to (f) and from (g) to (h)). After the degree of intensity of all of the incoming workloads are determined, such values are forward to the rule evaluation module 615.

Figure 9C:
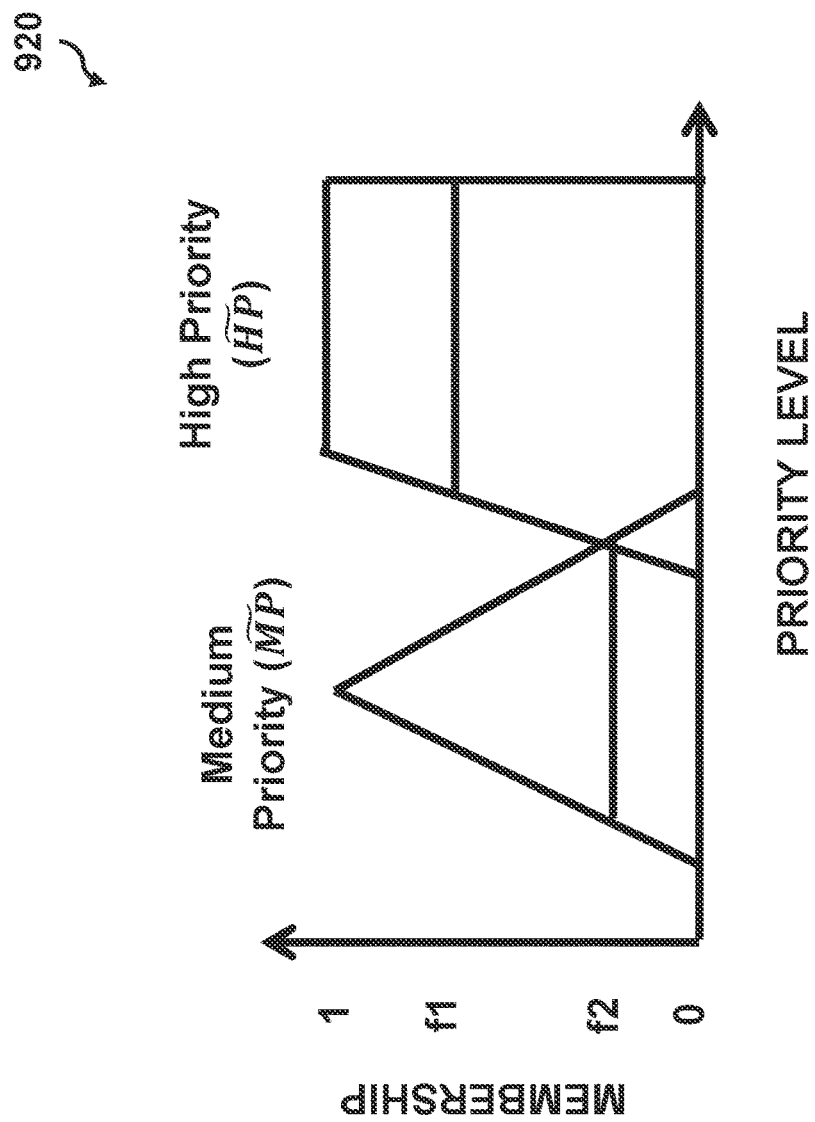

The rule evaluation module 615 is configured to evaluate a set of rules against the degree of intensity values for the incoming workloads to determine the strength of membership of the output fuzzy priority sets. The rule evaluation module 615 may store or otherwise have access to a set of control rules used for determining the strength of membership of the output fuzzy priority sets. Continuing with the example above, FIG. 8 shows a table 800 of control rules with columns for membership set, its associated fuzzy rule, and an interpretation for that fuzzy rule. As illustrated in the table 800, a fuzzy rule may be triggered even if a condition is partially true. For example, if a workload is partially low-intensive, then a non-zero membership value is assigned to the high priority fuzzy set. Similarly, if a workload is partially high-intensive, a non-zero membership function value is assigned to the low priority fuzzy set. Because of this, more than one fuzzy rule can be triggered for a given workload. In such cases, multiple output fuzzy priority sets will have non-zero strength or membership. FIGS. 9A-9C illustrate an example of this, where FIG. 9A shows plots 900 and 905, illustrating that a given workload has a value f1 (between 0 and 1) for a low fuzzy set ($\tilde{L}$) corresponding to a high priority level ($\widetilde{HP}$) value f1. The given workload, as illustrated in the plots 910 and 915 of FIG. 9B, also has a value f2 (between 0 and 1) for a moderate fuzzy set ($\tilde{M}$) corresponding to a medium priority level ($\widetilde{MP}$) value f2. FIG. 9C shows a plot 920 illustrating the combination of the medium and high priority levels for the given workload which has the non-zero membership value in multiple output fuzzy priority sets.

The defuzzification module 620 is configured to de-fuzzify the output priority provided by the rule evaluation module 615, to determine the absolute priority level for each workload. The defuzzification module 620 may consider a set of different defuzzification techniques to apply the most appropriate technique based on the scenario. Below are examples of defuzzification techniques that may be utilized:

$$P(x) = \begin{cases} \text{First of } Maxima_A(\mu_A(x)), & A = \widetilde{HP} \text{ and } \nexists \mu_{B_i}(x) \neq 0, \forall B_i \neq A \\ \text{Last of } Maxima_A(\mu_A(x)), & A \neq \widetilde{HP} \text{ and } \nexists \mu_{B_i}(x) \neq 0, \forall B_i \neq A \\ \dfrac{x_A * Area_A + \sum_1^n x_{B_i} * Area_{B_i}}{Area_A + \sum_1^n Area_{B_i}}, & \exists \mu_{B_i}(x) \neq 0 \text{ and } \mu_A(x) \neq 0, \forall B_i \neq A \end{cases}$$

where P(x) represents the priority level assigned to a workload with intensity x, A and $B_i$ represent fuzzy priority sets, $\mu_A$ and $\mu_{B_i}$ represent fuzzy membership functions, n represents the number of fuzzy priority sets other than A which have non-zero membership value, $x_A$ and $x_{B_i}$ represent the middle value or center of the fuzzy priority sets A and $B_i$, and $Area_A$ and $Area_{B_i}$ represent the area of the fuzzy priority sets A and $B_i$ after being clipped at their strengths.

The First of Maxima and Last of Maxima defuzzification techniques are used when only one rule is triggered by the rule evaluation module 615 and only one fuzzy priority set has a non-zero membership value. The First of Maxima defuzzification technique is applied when two conditions are met, as indicated in the equation above. The first condition, $A = \widetilde{HP}$, denotes that the fuzzy priority set A has a high priority level $\widetilde{HP}$. The second condition, $\nexists \mu_{B_i}(x) \neq 0, \forall B_i \neq A$, denotes that for all other fuzzy priority sets $B_i$ other than fuzzy priority set A ($\forall \mu_{B_i} \neq A$), the fuzzy membership functions $\mu_{B_i}$ have a zero membership value (e.g., $\nexists \mu_{B_i}(x) \neq 0$). More specifically, the notation $\exists \mu_{B_i}(x) \neq 0, \forall B_i \neq A$ denotes that there does not exist ($\nexists$) any fuzzy priority set $B_i$ having a membership function $\mu_{B_i}$ with a non-zero membership value ($\mu_{B_i}(x) \neq 0$), for all ($\forall$) fuzzy priority sets ($B_i$) other than fuzzy priority set A ($B_i \neq A$).

The Last of Maxima defuzzification technique is applied when two conditions are met, as indicated in the equation above. The first condition, $A \neq \widetilde{HP}$, denotes that the fuzzy priority set A is not a high priority level (e.g., the fuzzy priority set has a low priority level LP or medium priority level $\widetilde{MP}$). The second condition, $\exists \mu_{B_i}(x) \neq 0, \forall B_i \neq A$, denotes that for all other fuzzy priority sets $B_i$ other than fuzzy priority set A ($\forall B_i \neq A$), the fuzzy membership functions $\mu_{B_i}$ have a zero membership value (e.g., $\exists \mu_{B_i}(x) \neq 0$). More specifically, the notation $\exists \mu_{B_i}(x) \neq 0$, $\forall B_i \neq A$ denotes that there does not exist ($\exists$) any fuzzy priority set $B_i$ having a membership function $\mu_{B_1}$ with a non-zero membership value ($\mu_{B_1}(x) \neq 0$), for all ($\forall$) fuzzy priority sets ($B_i$) other than fuzzy priority set A ($B_i \neq A$).

A "center of sum" defuzzification technique is used when more than one rule is triggered by the result evaluation module 615 and more than one fuzzy priority set has a non-zero membership value. The center of sum, $$\frac{x_A * Area_A + \sum_{i=1}^{n} x_{B_i} * Area_{B_i}}{Area_A + \sum_{i=1}^{n} Area_{B_i}},$$

is applied when one condition is met, namely, that there are two fuzzy priority sets with non-zero membership values. This is represented in the equation above by $\exists \mu_{B_i}(x) \neq 0$ and $\mu_A(x) \neq 0$, $\forall B_i \neq A$, denoting that there exists ($\exists$) a fuzzy priority set $B_i$ with a membership function $\mu_{B_1}$ having a non-zero membership value ($\mu_{B_i}(x) \neq 0$) and a fuzzy priority set A with a membership function $\mu_A$ also having a non-zero membership value $\mu_A(x) \neq 0$, where the fuzzy priority sets $B_i$ and A are different ($B_i \neq A$).

Figure 10A:
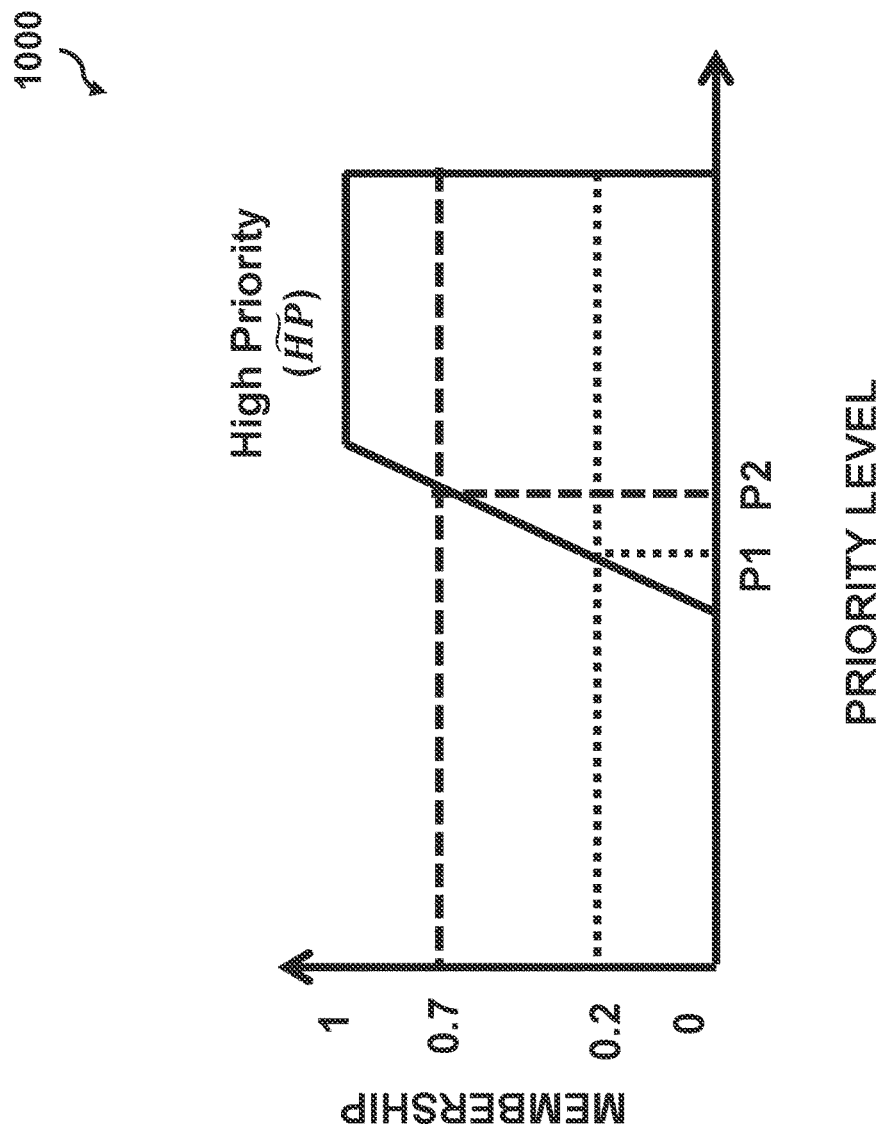
FIGS. 10A and 10B show plots of application of defuzzification techniques for assigning absolute priority level values in an illustrative embodiment.
Figure 10B:
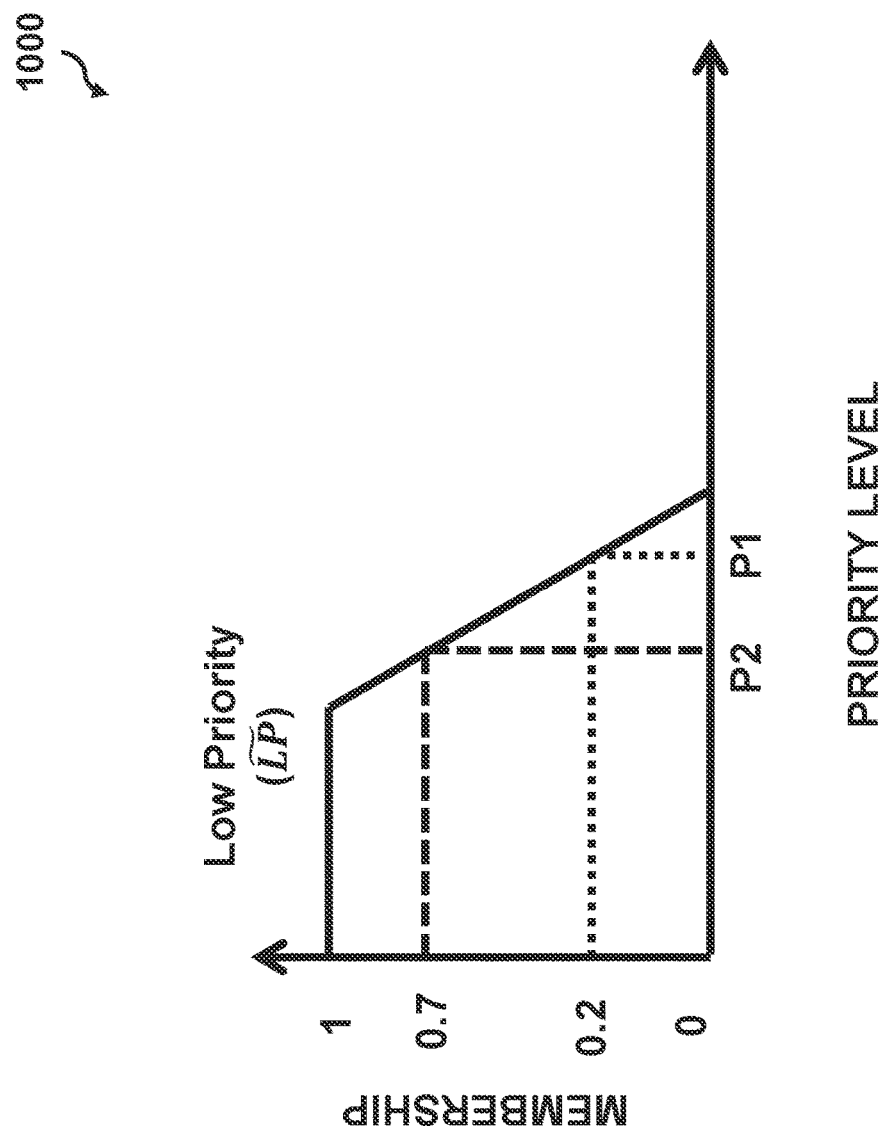

The First of Maxima defuzzification technique is applied when the high priority fuzzy set has a non-zero membership value, because the higher the membership in the high priority fuzzy set, the higher the priority level. Similarly, the Last of Maxima defuzzification technique is applied for low priority and medium priority fuzzy sets because the higher the membership in the low priority and medium priority fuzzy sets, the lower the priority level. FIGS. 10A and 10B illustrate plots 1000 and 1005 illustrating application of the First of Maxima and Last of Maxima defuzzification techniques, respectively.

Once the defuzzification module 620 determines the final priority values, such priority values are forwarded to the priority controller module 625. The priority controller module 625 is configured to prioritize and re-order the incoming workloads for execution on a deduplication-based storage system using the final priority values.

In a threshold-based approach, a given workload is classified as low intensity or high intensity based on whether the amount of deduplication-unfriendly data in the given workload is above or below some designated threshold. If the amount of deduplication-unfriendly data is lower than the designated threshold, then the given workload is classified as low-intensive or low intensity. Similarly, if the amount of deduplication-unfriendly data is higher than the designated threshold, then the given workload is classified as high-intensive or high intensity. There are various limitations to such a simple threshold-based approach. For example, a simple threshold-based approach fails to define or take into account the magnitude or degree of low intensity or high intensity of different workloads.

Figure 11:
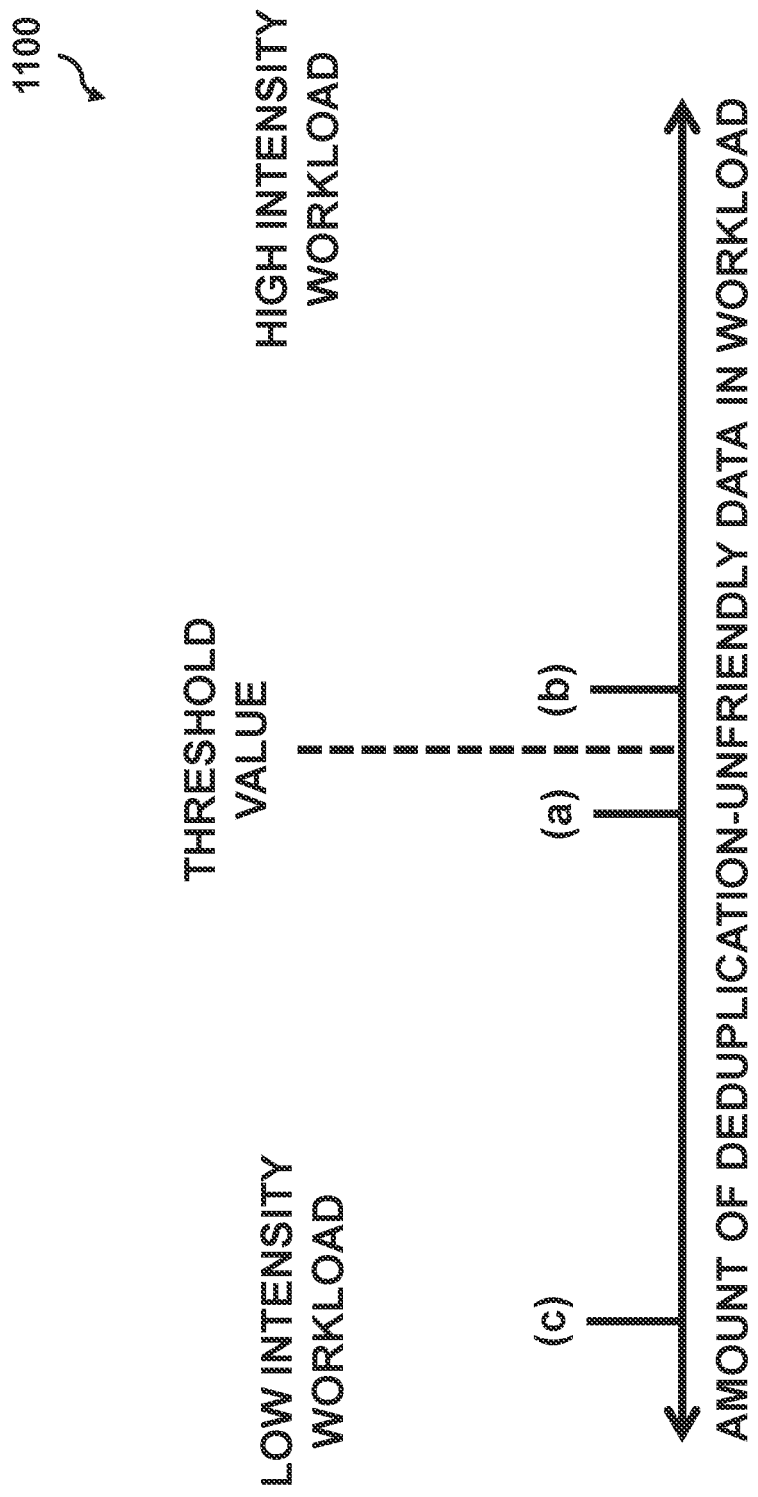
FIG. 11 shows a plot of a threshold-based approach for assigning priority levels in an illustrative embodiment.

FIG. 11 shows a plot 1100 illustrating such a threshold-based approach, where workloads are classified as low intensity or high intensity based on whether the amount of deduplication-unfriendly data in the workload is below or above a threshold value. In the plot 1100, a workload with an amount of deduplication-unfriendly data (a) is classified as low intensity and a workload with an amount of deduplication-unfriendly data (b) is classified as high intensity. The gap between the amount of deduplication-unfriendly data between such workloads, however, is low. Consider a workload with an amount of deduplication-unfriendly data (c) which is also classified as low intensity using the simple threshold-based approach. The workload with the amount of deduplication-unfriendly data (c) has a significantly lower amount of deduplication-unfriendly data as compared to the workload with the amount of deduplication-unfriendly data (a), though they would be classified and treated the same. This is due to the threshold-based approach failing to define or consider the exact degree or magnitude of deduplication-unfriendly data intensity for different workloads.

Figure 12:
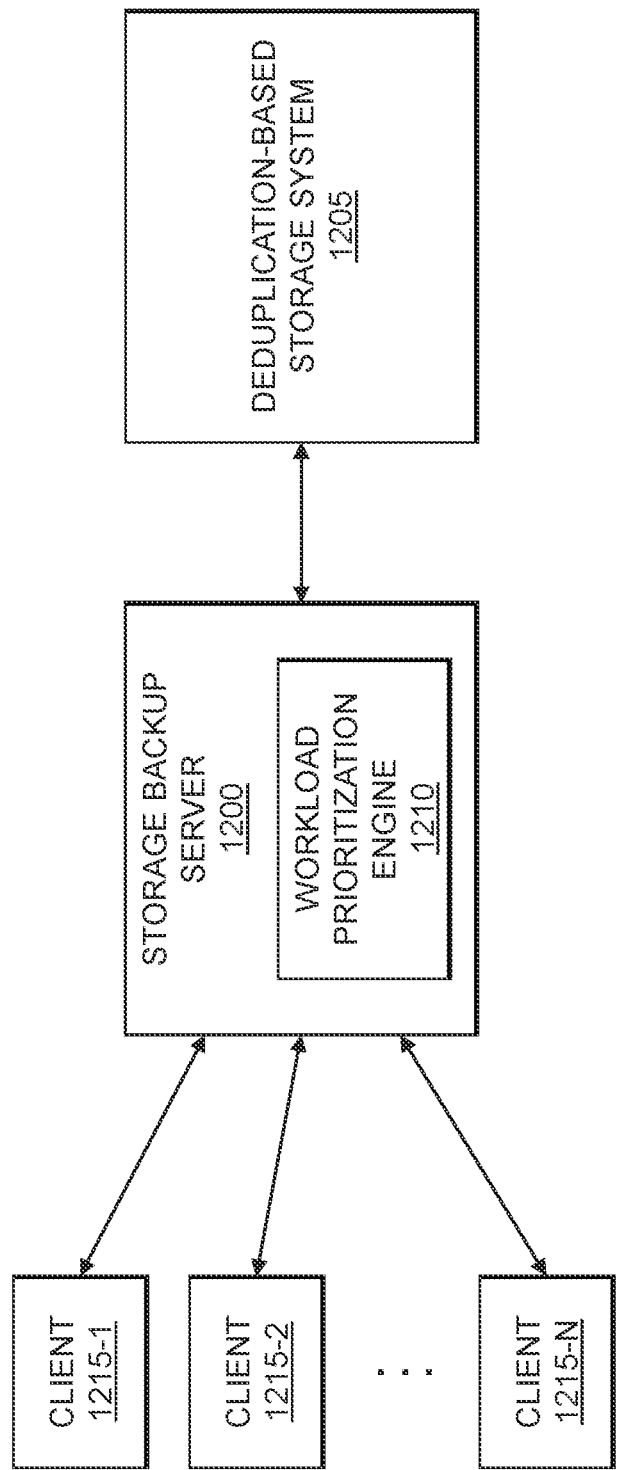
FIG. 12 shows a set of clients providing workloads to a storage backup server implementing a workload prioritization engine for assigning the workloads to a deduplication-based storage system in an illustrative embodiment.
Figure 13A:
FIG. 13A shows a table of priority levels assigned to workloads using a threshold-based approach in an illustrative embodiment.

FIG. 12 illustrates a backup storage environment, including a storage backup server 1200 (e.g., Avamar) in communication with a deduplication-based storage system 1205 (e.g., DataDomain). The storage backup server 1200 implements a workload prioritization engine 1210, which is configured to receive and analyze incoming workloads from clients 1215-1, 1215-2, . . . 1215-N (collectively, clients 1215). FIG. 13A shows a table 1300 illustrating classification of the deduplication-unfriendliness intensity of different incoming workloads from the clients 1215 using a simple threshold-based approach, where each incoming workload is assigned a binary value (e.g., each incoming workload is classified as either low or high intensity only). Thus, irrespective of the amount of deduplication-unfriendly data in the workload, it can only be classified as low intensity or high intensity. If a backup operation is triggered, then the workloads may be processed or selected arbitrarily (e.g., if current workloads consume all the streams that a storage system can support, then any further workloads will be in a queued state until the streams become available).

Consider again the example of FIG. 11, where the workloads with amounts of deduplication-unfriendly data (a) and (b) are substantially identical on the intensity scale, but are classified differently based on the intensity threshold. If the workload with the amount of deduplication-unfriendly data (a) is selected to be backed up ahead of the workload with the amount of deduplication-unfriendly data (c), which may be the case since they are both classified as low intensity, this will exacerbate the current condition of the storage consumption and thus provide no value during special conditions (e.g., when capacity of the storage system is nearing a full condition).

Figure 13B:
FIG. 13B shows a table of priority levels assigned to workloads based on determining an amount or magnitude of deduplication-unfriendly data in the workloads in an illustrative embodiment.

FIG. 13B shows a table 1305 illustrating classification of the deduplication-unfriendliness intensity of different incoming workloads where the fuzzy classification approach is applied to determine a magnitude or degree of the deduplication-unfriendliness intensity. Using this approach, the different workloads may be ranked by their deduplication-unfriendliness intensity value, to provide a more intelligent prioritization of the different workloads. Fuzzy sets and fuzzy membership functions may be utilized to identify and classify the workloads in a more granular fashion based on the intensity of deduplication-unfriendly data, where each workload is assigned a value between 0 and 1. Rankings are assigned, such that workloads with relatively low intensity of deduplication-unfriendly data are given higher priority and workloads with relatively high intensity of deduplication-unfriendly data are given lower priority during special conditions (e.g., when capacity of a storage system is nearing a full condition).

When the storage space on the deduplication-based storage system 1205 reaches a predefined threshold value (e.g., 85%), incoming workloads may be identified and automatically ranked based on their associated intensity of deduplication-unfriendly data using the workload prioritization engine 1210. The storage backup server 1200 can then perform backup jobs based on rankings of the incoming workloads that are provided by the workload prioritization engine 1210. In some embodiments, prioritization happens at the workload level as a whole to maintain consistency of data. For example, once the deduplication-based storage system 1205 reaches the predefined storage space value, then prioritizations will happen for the next scheduled or on-demand backup operations, not for ongoing backup jobs. In the above considered case, prioritizations will happen for the next scheduled/on-demand backup operations and not for the on-going backup jobs.

Since the deduplication-based storage system 1205 may have a limited number of streams that it can support, the storage backup server 1200 can utilize the prioritizations provided by the workload prioritization engine 1210 to consume those streams optimally thus reducing the storage consumption rate of the deduplication-based storage system 1205. Advantageously, this gives end-users more time to perform proactive measures to free up storage space on the deduplication-based storage system 1205. Various types of proactive measures may be taken, including rule-based migration of "unique cold data" to other storage (e.g., cloud-based storage), adaptive policy-enforcing mechanisms for performing automatic and dynamic resource allocation for data movement and garbage collection processes to free up storage space as fast as possible, requesting or procuring additional storage resources (e.g., notifying sales teams or other authorized users to ship or deploy additional storage to end-users that are predicted to run out of storage space), etc.

The techniques described herein provide a number of advantages in helping to avoid deduplication-based storage systems reaching storage full condition. Illustrative embodiments implement an automatic intelligent prioritization of incoming workloads for deduplication-based storage systems when storage consumption on the deduplication-based storage systems reach a threshold value. The intelligent prioritization is based on the amount of deduplication-unfriendly data in the incoming workloads, helping to slow the rate at which storage fills on the deduplication-based storage systems thus giving end users more time to perform proactive measures for freeing up space on the deduplication-based storage systems. Some embodiments utilize a fuzzy approach for automatic prioritization of incoming workloads based on the intensity of deduplication-unfriendly data in the workloads. Thus, the degree or magnitude of priority is defined for the workloads based on deduplication-unfriendly data using fuzzy sets and membership functions.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for scheduling workloads based on predicted magnitude of storage capacity savings achieved through deduplication will now be described in greater detail with reference to FIGS. 14 and 15. Although described in the context of system 100, these platforms may also be used to implement at least portions of other information processing systems in other embodiments.

Figure 14:
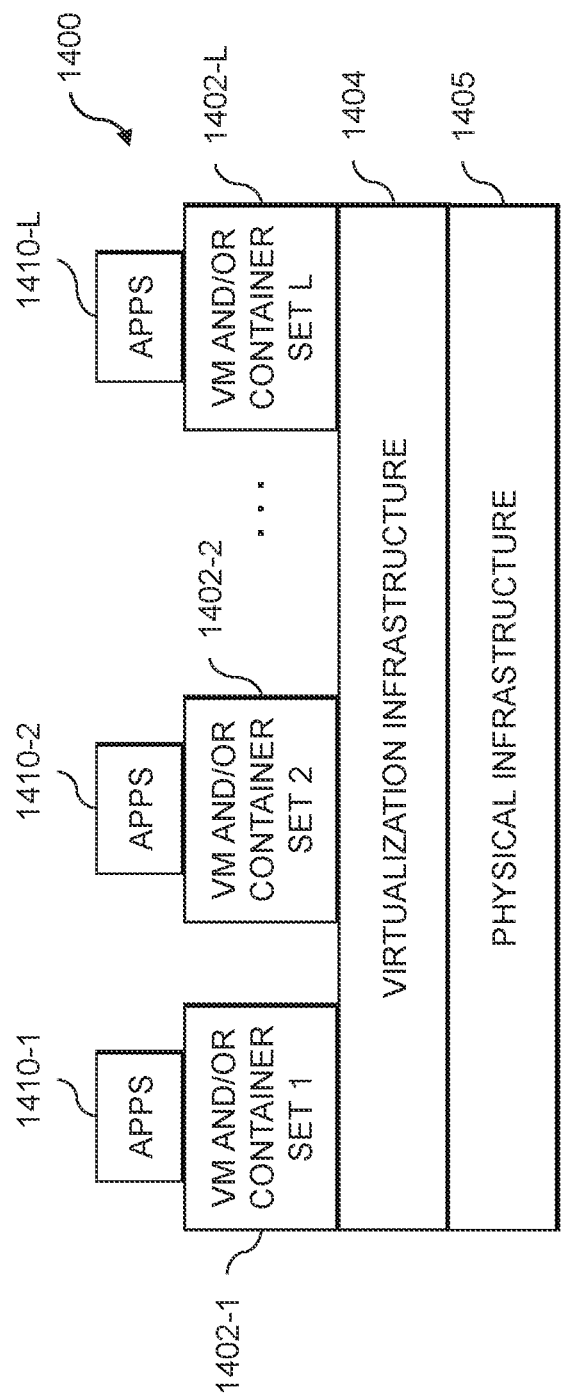
FIGS. 14 and 15 show examples of processing platforms that may be utilized to implement at least a portion of an information processing system in illustrative embodiments.
Figure 15:
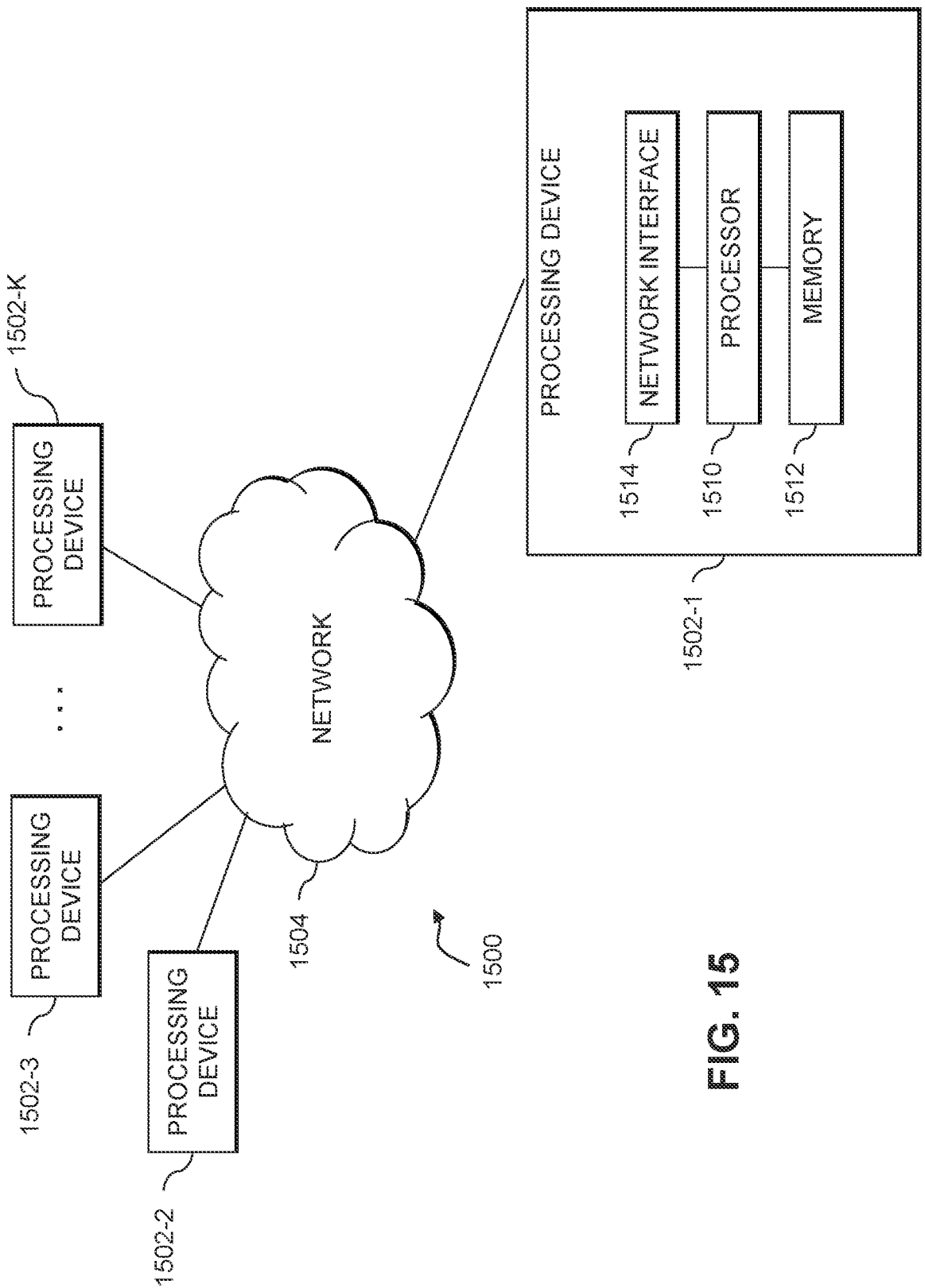

FIG. 14 shows an example processing platform comprising cloud infrastructure 1400. The cloud infrastructure 1400 comprises a combination of physical and virtual processing resources that may be utilized to implement at least a portion of the information processing system 100 in FIG. 1. The cloud infrastructure 1400 comprises multiple virtual machines (VMs) and/or container sets 1402-1, 1402-2, . . . 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2, . . . 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. A hypervisor platform may be used to implement a hypervisor within the virtualization infrastructure 1404, where the hypervisor platform has an associated virtual infrastructure management system. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100 and includes a plurality of processing devices, denoted 1502-1, 1502-2, 1502-3, . . . 1502-K, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512.

The processor 1510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements. The memory 1512 may comprise random access memory (RAM), read-only memory (ROM), flash memory or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for scheduling workloads based on predicted magnitude of storage capacity savings achieved through deduplication as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, membership functions, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      identifying a plurality of workloads to be scheduled for execution on a storage system, the plurality of workloads being associated with a first order, the first order being determined based at least in part on times at which the plurality of workloads are received;
      analyzing the plurality of workloads to predict a magnitude of storage capacity savings achieved by applying one or more deduplication algorithms to data of the plurality of workloads;
      determining a prioritization of the plurality of workloads based at least in part on the predicted magnitude of the storage capacity savings achieved by applying the one or more deduplication algorithms to the data of the plurality of workloads;
      determining a scheduling of the plurality of workloads, based at least in part on the determined prioritization of the plurality of workloads, to reduce a rate at which an available storage capacity of the storage system is consumed by re-ordering the plurality of workloads to a second order, the second order having a first one of the plurality of workloads having a first predicted magnitude of storage capacity savings prior to a second one of the plurality of workloads having a second predicted magnitude of storage capacity savings, the first predicted magnitude of storage capacity savings being greater than the second predicted magnitude of storage capacity savings, the first one of the plurality of workloads being received later than the second one of the plurality of workloads; and
      executing the plurality of workloads on the storage system in accordance with the determined scheduling to reduce the rate at which the available storage capacity of the storage system is consumed.

2. The apparatus of claim 1 wherein determining the scheduling of the plurality of workloads and executing the plurality of workloads in accordance with the determined scheduling are performed responsive to determining that the storage system has reached a designated threshold capacity usage.

3. The apparatus of claim 1 wherein analyzing the plurality of workloads to predict the magnitude of the storage capacity savings achieved by applying the one or more deduplication algorithms to the data of the plurality of workloads comprises identifying one or more types of data that are part of respective ones of the plurality of workloads.

4. The apparatus of claim 1 wherein predicting the magnitude of the storage capacity savings achieved by applying the one or more deduplication algorithms to the data of a given one of the plurality of workloads comprises:
   detecting an amount of the data of the given workload predicted to achieve storage capacity savings by applying the one or more deduplication algorithms; and
   determining membership of the given workload in respective ones of a plurality of membership functions based at least in part on the detected amount of data of the given workload predicted to achieve storage capacity savings by applying the one or more deduplication algorithms.

5. The apparatus of claim 4 wherein determining the prioritization of the given workload comprises assigning a priority value to the given workload based at least in part on its membership values for at least one of the plurality of membership functions.

6. The apparatus of claim 4 wherein determining the prioritization of the given workload comprises assigning a priority value to the given workload based at least in part on a combination of its membership values for each of the plurality of membership functions.

7. The apparatus of claim 4 wherein the plurality of membership functions comprises:
a first membership function for workloads with a first range of detected amounts of data predicted to achieve storage capacity savings by applying the one or more deduplication algorithms;
a second membership function for workloads with a second range of detected amounts of data predicted to achieve storage capacity savings by applying the one or more deduplication algorithms; and
a third membership function for workloads with a third range of detected amounts of data predicted to achieve storage capacity savings by applying the one or more deduplication algorithms.

8. The apparatus of claim 7 wherein the first range at least partially overlaps the second range, and wherein the second range at least partial overlaps the third range.

9. The apparatus of claim 7 wherein the first membership function and the third membership function comprise trapezoidal membership functions, and wherein the second membership function comprises a triangular membership function.

10. The apparatus of claim 4 wherein the plurality of membership functions comprises fuzzy membership sets, and wherein determining the prioritization of the given workload comprises assigning a priority value to the given workload based at least in part on applying one or more defuzzification algorithms to membership values of the given workload in each of the fuzzy membership sets.

11. The apparatus of claim 10 wherein applying the one or more defuzzification algorithms comprises applying one of a first of maxima defuzzification algorithm and a last of maxima defuzzification algorithm responsive to the given workload having a non-zero membership value for a single one of the fuzzy membership sets.

12. The apparatus of claim 11 wherein the first of maxima defuzzification algorithm is utilized when the given workload has a non-zero membership value for a single one of the fuzzy membership sets having a highest priority level.

13. The apparatus of claim 11 wherein the last of maxima defuzzification algorithm is utilized when the given workload has a non-zero membership value for a single one of the fuzzy membership sets having a priority level below a highest priority level.

14. The apparatus of claim 10 wherein applying the one or more defuzzification algorithms comprises applying a center of sum defuzzification algorithm responsive to the given workload having a non-zero membership value for at least two of the fuzzy membership sets.

15. A computer program product comprising a non-transitory processor-readable storage medium having stored therein program code of one or more software programs, wherein the program code when executed by at least one processing device causes the at least one processing device to perform steps of:
identifying a plurality of workloads to be scheduled for execution on a storage system, the plurality of workloads being associated with a first order, the first order being determined based at least in part on times at which the plurality of workloads are received;
analyzing the plurality of workloads to predict a magnitude of storage capacity savings achieved by applying one or more deduplication algorithms to data of the plurality of workloads;
determining a prioritization of the plurality of workloads based at least in part on the predicted magnitude of the storage capacity savings achieved by applying the one or more deduplication algorithms to the data of the plurality of workloads;
determining a scheduling of the plurality of workloads, based at least in part on the determined prioritization of the plurality of workloads, to reduce a rate at which an available storage capacity of the storage system is consumed by re-ordering the plurality of workloads to a second order, the second order having a first one of the plurality of workloads having a first predicted magnitude of storage capacity savings prior to a second one of the plurality of workloads having a second predicted magnitude of storage capacity savings, the first predicted magnitude of storage capacity savings being greater than the second predicted magnitude of storage capacity savings, the first one of the plurality of workloads being received later than the second one of the plurality of workloads; and
executing the plurality of workloads on the storage system in accordance with the determined scheduling to reduce the rate at which the available storage capacity of the storage system is consumed.

16. The computer program product of claim 15 wherein predicting the magnitude of the storage capacity savings achieved by applying the one or more deduplication algorithms to the data of a given one of the plurality of workloads comprises:
detecting an amount of the data of the given workload predicted to achieve storage capacity savings by applying the one or more deduplication algorithms; and
determining membership of the given workload in respective ones of a plurality of membership functions based at least in part on the detected amount of data of the given workload predicted to achieve storage capacity savings by applying the one or more deduplication algorithms.

17. The computer program product of claim 16 wherein the plurality of membership functions comprises fuzzy membership sets, and wherein determining the prioritization of the given workload comprises assigning a priority value to the given workload based at least in part on applying one or more defuzzification algorithms to membership values of the given workload in each of the fuzzy membership sets.

18. A method comprising:
identifying a plurality of workloads to be scheduled for execution on a storage system, the plurality of workloads being associated with a first order, the first order being determined based at least in part on times at which the plurality of workloads are received;
analyzing the plurality of workloads to predict a magnitude of storage capacity savings achieved by applying one or more deduplication algorithms to data of the plurality of workloads;

determining a prioritization of the plurality of workloads based at least in part on the predicted magnitude of the storage capacity savings achieved by applying the one or more deduplication algorithms to the data of the plurality of workloads;

determining a scheduling of the plurality of workloads, based at least in part on the determined prioritization of the plurality of workloads, to reduce a rate at which an available storage capacity of the storage system is consumed by re-ordering the plurality of workloads to a second order, the second order having a first one of the plurality of workloads having a first predicted magnitude of storage capacity savings prior to a second one of the plurality of workloads having a second predicted magnitude of storage capacity savings, the first predicted magnitude of storage capacity savings being greater than the second predicted magnitude of storage capacity savings, the first one of the plurality of workloads being received later than the second one of the plurality of workloads; and executing the plurality of workloads on the storage system in accordance with the determined scheduling to reduce the rate at which the available storage capacity of the storage system is consumed;

wherein the method is performed by at least one processing device comprising a processor coupled to a memory.

19. The method of claim 18 wherein predicting the magnitude of the storage capacity savings achieved by applying the one or more deduplication algorithms to the data of a given one of the plurality of workloads comprises:

detecting an amount of the data of the given workload predicted to achieve storage capacity savings by applying the one or more deduplication algorithms; and determining membership of the given workload in respective ones of a plurality of membership functions based at least in part on the detected amount of data of the given workload predicted to achieve storage capacity savings by applying the one or more deduplication algorithms.

20. The method of claim 19 wherein the plurality of membership functions comprises fuzzy membership sets, and wherein determining the prioritization of the given workload comprises assigning a priority value to the given workload based at least in part on applying one or more defuzzification algorithms to membership values of the given workload in each of the fuzzy membership sets.

* * * * *